United States Patent
Jeon (10) Patent No.: US 7,193,382 B2
(45) Date of Patent: Mar. 20, 2007

(54) APPARATUS FOR DETECTING OVER CURRENT OF MOTOR IN VEHICLE

(75) Inventor: Young-Chang Jeon, Soe-gu (KR)

(73) Assignee: Siemens VDO Halla, Ltd. (KR)

( * ) Notice: Subject to any disclaimer, the term of this patent is extended or adjusted under 35 U.S.C. 154(b) by 55 days.

(21) Appl. No.: 11/202,651

(22) Filed: Aug. 12, 2005

(65) Prior Publication Data

US 2007/0014057 A1    Jan. 18, 2007

(51) Int. Cl.
*H02P 29/02* (2006.01)
(52) U.S. Cl. .................. 318/434; 361/31; 361/93.9; 388/903
(58) Field of Classification Search ............... 318/139, 318/430–434; 388/903, 907.5, 909, 930; 361/23–34, 93.1, 93.9, 98
See application file for complete search history.

(56) References Cited

U.S. PATENT DOCUMENTS

| | | | | |
|---|---|---|---|---|
| 4,532,567 A | * | 7/1985 | Kade | ............................ 361/31 |
| 5,483,141 A | * | 1/1996 | Uesugi | ........................ 318/811 |
| 5,530,788 A | * | 6/1996 | Saijima | ....................... 388/811 |
| 6,717,785 B2 | * | 4/2004 | Fukuda et al. | .............. 361/93.1 |
| 7,079,368 B2 | * | 7/2006 | Ishikawa et al. | ............ 361/93.1 |
| 7,113,376 B2 | * | 9/2006 | Nomura et al. | ................ 361/31 |

* cited by examiner

*Primary Examiner*—Bentsu Ro
(74) *Attorney, Agent, or Firm*—R. Neil Sudol; Henry D. Coleman; William J. Sapone (57) ABSTRACT

An apparatus for over current detection of a motor for use in a vehicle. This invention prevents the motor from burning out by more precisely detecting an over current of the motor within an overall drive area of the motor. This can be accomplished by setting, as an over current detection reference current, a predefined range between a normal current and a constraint current of the motor by drive input conditions of the motor, detecting a current of the motor flowing in a field effect transistor (FET) via a shunt resistor and a differential amplifier, and comparing the detected current with the over current detection reference current.

3 Claims, 8 Drawing Sheets

APPARATUS FOR DETECTING OVER CURRENT OF MOTOR IN VEHICLE

BACKGROUND OF THE INVENTION

1. Field of the Invention

The present invention relates to an apparatus for detecting an over current of a motor for use in a vehicle. More particularly, this invention is directed to an over current detection apparatus of a motor in a vehicle which is capable of preventing the motor from burning out by more precisely detecting an over current of the motor within an overall drive area thereof, wherein this is achieved by setting, as an over current detection reference current, a predefined range between a normal current and a constraint current of the motor by drive input conditions of the motor, detecting a current of the motor flowing in a field effect transistor (FET) via a shunt resistor and a differential amplifier, and comparing the detected current with the over current detection reference current.

2. Description of Related Art

In general, a motor is known to provide a driving force necessary for vehicle operation, wherein a power required by the vehicle is supplied by adjusting rotary power of the motor under the control of a microprocessor. Such a motor may burn out due to over current that occurs due to internal, external, or constraint effects, etc., during the operation of the motor.

Figure 1:
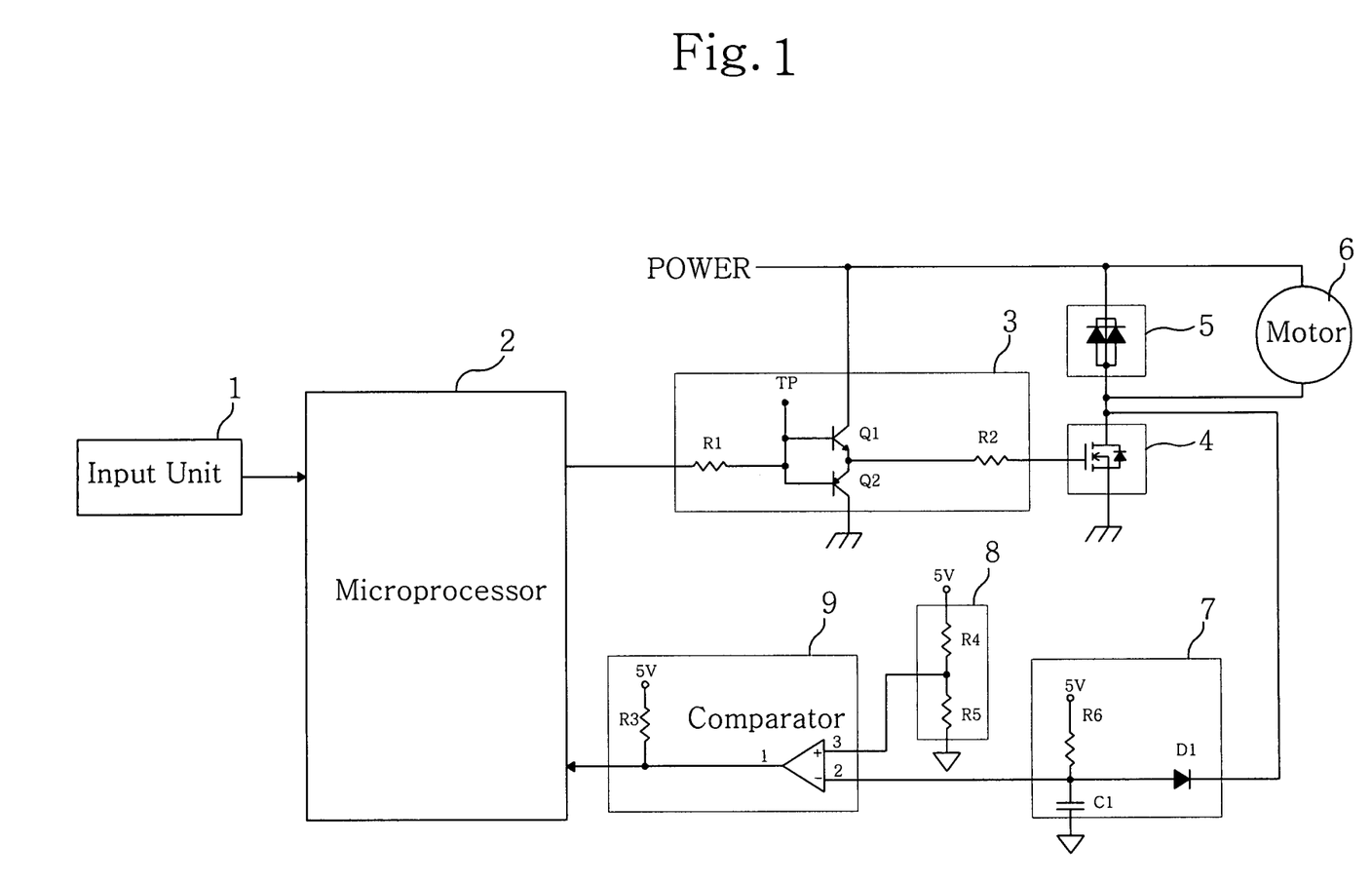
FIG. 1 illustrates a circuit diagram showing a configuration of an over current detection device of a motor used in a vehicle according to the prior art.

As such, since the prior art motor burns out due to over current unless such over current is accurately detected and the operation of the motor is stopped to prevent burn out upon the detection of the over current, an over current detection of the motor has conventionally been performed through an over current detection device as illustrated in FIG. 1, in order to prevent the above phenomenon.

FIG. 1 is a circuit diagram showing a configuration of an over current detection device of a motor used in a vehicle according to the prior art. This prior art device comprises an input unit 1 for inputting an external signal including motor drive information with duty cycle, a microprocessor 2 that provides an FET drive control signal to drive an FET according to the motor drive information in the external signal from the input unit 1, determines whether or not there occurs an over current state in the motor based on an output from a comparison unit 9 to be described below, and controls the motor to halt its operation upon the occurrence of the over current, an FET driver 3 for generating an FET drive signal in response to the FET drive control signal provided by the microprocessor 2, an FET 4 as a motor driving element that is turned ON/OFF depending on the FET drive signal from the FET driver 3, a freewheeling diode 5 for passing a recovery current for continuous operation of the motor when the FET 4 is OFF, the motors 6 that is driven according to the operations of the FET 4 and the freewheeling diode 5 and provides a driving force necessary for the vehicle's operation, a voltage detector 7 for detecting a voltage that is taken between both ends of the FET 4 produced by a current flowing in an internal resistor of the FET 4, a reference voltage setting unit 8 for setting an over current detection voltage for the motor 6 as a reference voltage, and the comparison unit 9 for comparing the voltage detected by the voltage detector 7 with the reference voltage set by the reference voltage setting unit 8 and providing the microprocessor 2 with an output voltage of high level implying the normal state if the detected voltage is less than the reference voltage and with an output voltage of low level meaning the issuance of the over current state if the detected voltage is above the reference voltage.

Figure 2A:
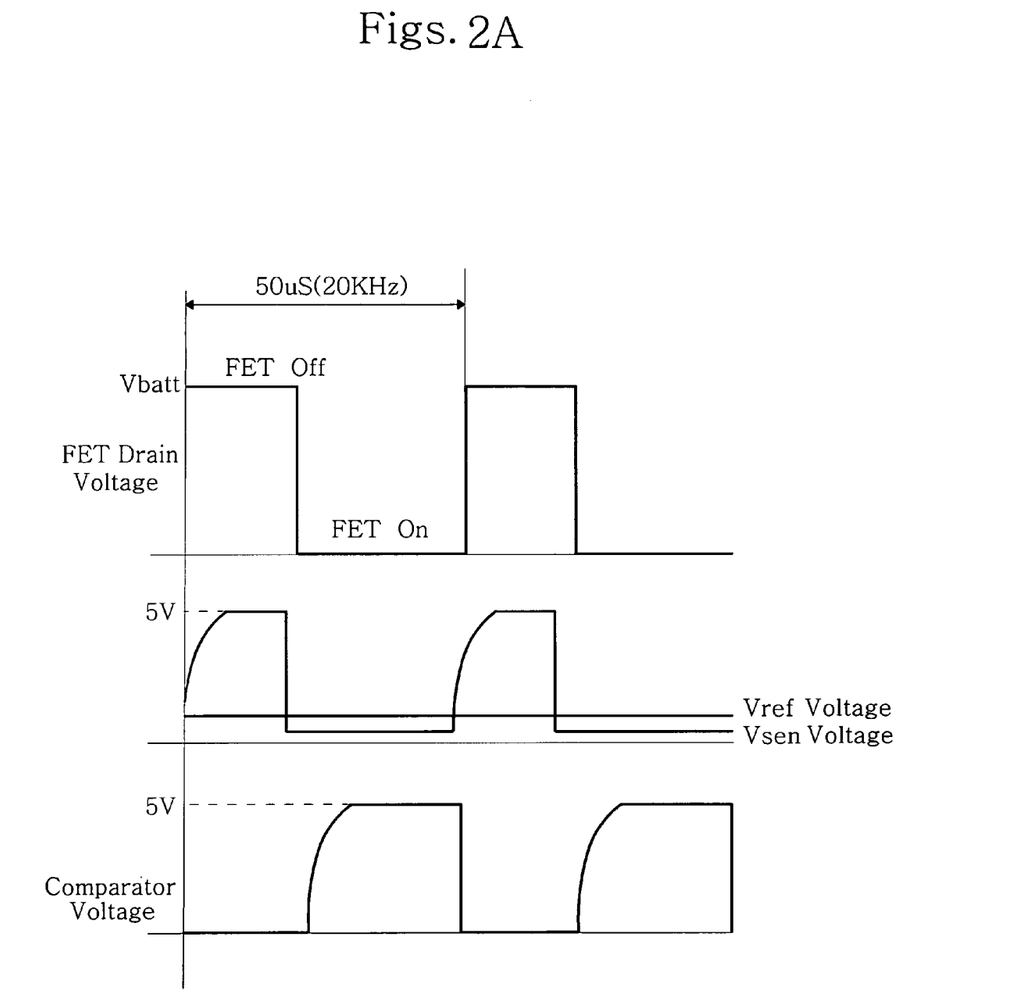
FIGS. 2A and 2B show output waveforms resulting when the motor is in the normal state and over current state, respectively, according to the conventional over current detection device.
Figure 2B:
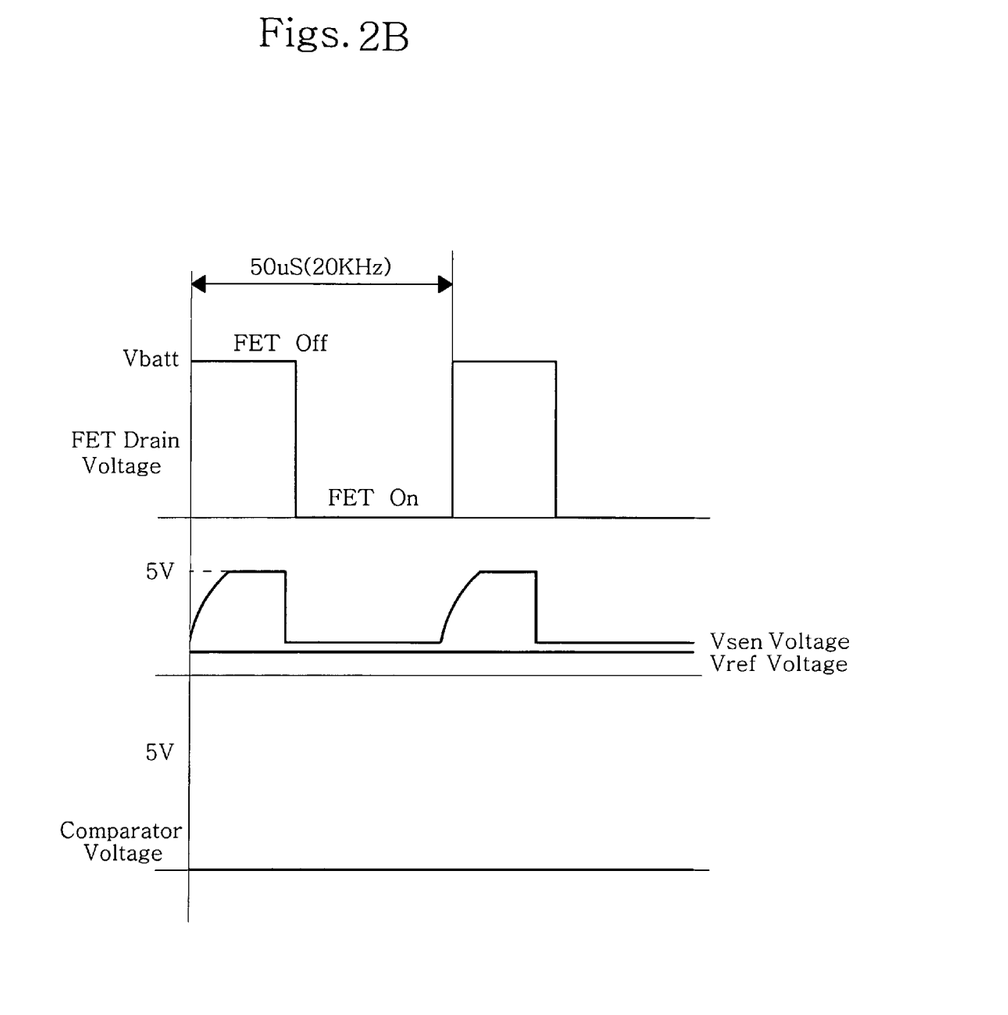

FIGS. 2A and 2B show output waveforms resulting when the motor is in the normal state and over current state, respectively, according to the conventional over current detection device. With reference to these drawings, an operation of the conventional over current detection device will be described in detail below.

At first, the microprocessor 2 included in the prior art over current detection device inputs the motor drive information in the external signal from the input unit 1 and controls the FET driver 3 according to the motor drive information so as to drive the FET 4. Upon the ON operation of the FET 4, the motor 6 is driven by a power (or supply voltage); and upon the OFF operation of the FET 4, the recovery current issuing from the motor 6 enables it to be continuously driven by passing the current through the freewheeling diode 5.

The FET 4 includes an internal resistor and the ON operation of the FET 4 is controlled according to the motor drive information. Based on the current variation by such ON operation of the FET 4, the voltage between both ends of the internal resistor in the FET 4 is varied.

After that, a comparator contained in the comparison unit 9 compares the voltage between both ends of the FET 4 detected by the voltage detector 7 with the reference voltage provided by the reference voltage setting unit 8. From the comparison, the comparator provides the microprocessor 2 with an output voltage of 5 V if the detected voltage is less than the reference voltage, and with an output voltage of 0 V if not, i.e., if the detected voltage is above the reference voltage.

Then, the microprocessor 2 determines that the motor 6 is in the normal state if the output voltage from the comparison unit 9 is at a high level of 5 V; and, conversely, it determines that an over current state is present in the motor 6 if the output voltage is at a low level of 0 V, and halts the operation of the motor in order to prevent the motor from burning out due to the occurrence of the over current.

In the conventional over current detection device of the motor for use in the vehicle as mentioned above, however, there exist some problems as set forth below.

That is, since the internal resistor in the FET exhibits slight variation due to manufacturing tolerances and thus is varied depending upon the temperature for the same FET, a dispersion of the detected voltage by the current flowing in the FET becomes large.

Consequently, there may be a problem that the power necessary for vehicle operation is not supplied thereto due to the interruption of the motor that arises when the detected voltage exceeds the reference voltage upon their comparison, even under the normal state. In particular, in the case of an engine cooling motor, the engine may overheat, causing the vehicle to break down.

Further, under the condition that an over current may occur, if the motor is driven continuously as the detected voltage is less than the reference voltage to thereby make an issuance of a larger current, there ultimately exists an instance where the motor burns out.

In addition, since the reference voltage set by the reference voltage setting unit for the over current detection cannot be modified, it may be determined that the detected voltage is less than the reference voltage, upon the issuance of the over current of the motor when the motor is driven with low current. Accordingly, over current of the motor is not detected, leading to motor burn out.

SUMMARY OF THE INVENTION

It is, therefore, a primary object of the present invention to provide an over current detection apparatus of a motor in a vehicle which is capable of preventing the motor from burning out by more precisely detecting an over current of the motor within an overall drive area thereof, wherein this is achieved by setting, as an over current detection reference current, a predefined range between a normal current and a constraint current of the motor by drive input conditions of the motor, detecting a current of the motor flowing in an FET via a shunt resistor and a differential amplifier, and comparing the detected current with the over current detection reference current.

In accordance with the present invention, there is provided an apparatus for detecting an over current of a motor in a vehicle, comprising: an input unit for inputting an external square wave signal including motor drive information duty cycle, wherein the signal is converted into an electric potential recognizable by a microprocessor; the microprocessor, which provides a drive control signal to drive a field effect transistor (FET) based on the motor drive information in the external square wave signal from the input unit, sets, as an over current detection reference current to determine an over current state, a predefined range between a normal current and a constraint current by driving input conditions of the motor within an overall drive area of the motor, and compares a motor detection current that corresponds to an output voltage from a smoothing unit with the reference current, wherein it is decided that the motor is in a normal state if the detection current is less than the reference current and in an over current state if the detection current is greater than the reference current, and halts the operation of the motor when the motor is in the over current state; an FET driver for amplifying and outputting an FET drive signal to drive the motor in response to the FET drive control signal provided by the microprocessor; an FET turned ON/OFF in accordance with the FET drive signal from the FET driver; a freewheeling diode for passing a recovery current for continuous operation of the motor when the FET is OFF; the motor, which is driven in response to the operations of the FET and the freewheeling diode, for providing a driving force necessary for vehicle operation; a shunt resistor connected to one end of the FET for detecting a current of the motor flowing in the FET; an amplifier for detecting and amplifying a voltage produced by the current flowing via the shunt resistor, while eliminating ground electronic potential effects that vary depending upon the current, using a differential amplifier; and the smoothing unit for smoothing the voltage amplified by the amplifier and providing the smoothed voltage to the microprocessor.

BRIEF DESCRIPTION OF THE DRAWINGS

The above and other objects and features of the present invention will become apparent from the following description of preferred embodiments taken in conjunction with the accompanying drawings, in which.

DESCRIPTION OF THE PREFERRED EMBODIMENT

Hereinafter, a structure and an operation of an over current detection apparatus of a motor for use in a vehicle in accordance with the present invention will be explained in detail with reference to the accompanying drawings.

Figure 3:
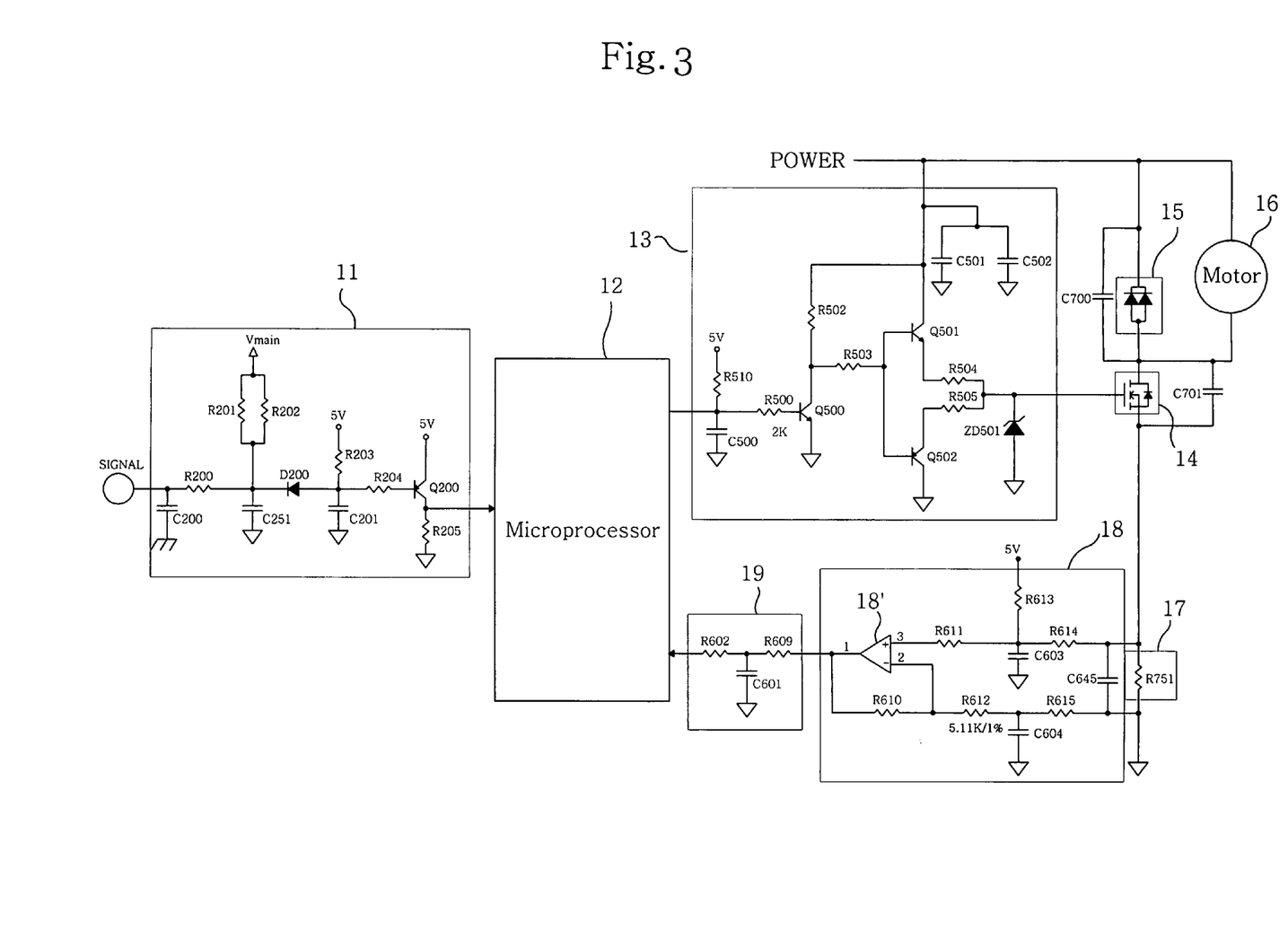
FIG. 3 is a circuit diagram showing a configuration of an over current detection apparatus of a motor for a vehicle in accordance with the present invention.

FIG. 3 is a circuit diagram showing a configuration of an over current detection apparatus of a motor for a vehicle in accordance with a preferred embodiment of the present invention. The inventive apparatus comprises an input unit 11 for inputting an external square wave signal including motor drive information with duty cycle wherein the signal is converted into an electric potential of 5 V recognizable by a microprocessor 12 to be described below, the microprocessor 12 which provides an FET drive control signal to drive an FET based on the motor drive information in the external square wave signal from the input unit 11, sets, as an over current detection reference current in order to detect an over current state, a predetermined range between a normal current and a constraint current of the motor by drive input conditions of the motor within an overall drive area of the motor, compares a motor detection current that corresponds to an output voltage from a smoothing unit 19 to be mentioned later with the reference current wherein it is determined that the motor is in a normal state if the detection current is less than the reference current and in an over current state if not, and controls the motor to stop its operation when the motor is in the over current state, an FET driver 13 for amplifying and outputting an FET drive signal in response to the FET drive control signal provided by the microprocessor 12, an FET 14 that is turned ON/OFF in accordance with the FET drive signal from the FET driver 13, a freewheeling diode 15 for passing a recovery current for continuous operation of the motor when the FET 14 is OFF, the motor 16, which is driven in response to the operations of the FET 14 and the freewheeling diode 15, for providing a driving force necessary for the vehicle's operation, a shunt resistor 17 connected to one end of the FET 14 for detecting a current of the motor 16 flowing in the FET 14, an amplifier 18 for detecting and amplifying a voltage produced by the current flowing via the shunt resistor 17, while eliminating ground electronic potential effects that vary depending upon the current, using a differential amplifier 18', and the smoothing unit 19 for smoothing the voltage amplified by the amplifier 18 and providing it to the microprocessor 12.

Using the differential amplifier 18' in detecting the voltage produced by the current flowing via the shunt resistor 17 by the amplifier 18, the present invention can more accurately detect the current flowing in the FET 14 via the motor 16, by preventing a change of ground electric potential that occurs due to current difference.

The operation of the over current detection apparatus of the motor for the vehicle in accordance with the invention as configured early will now be explained in detail with reference to the accompanying drawings.

Figure 4A:
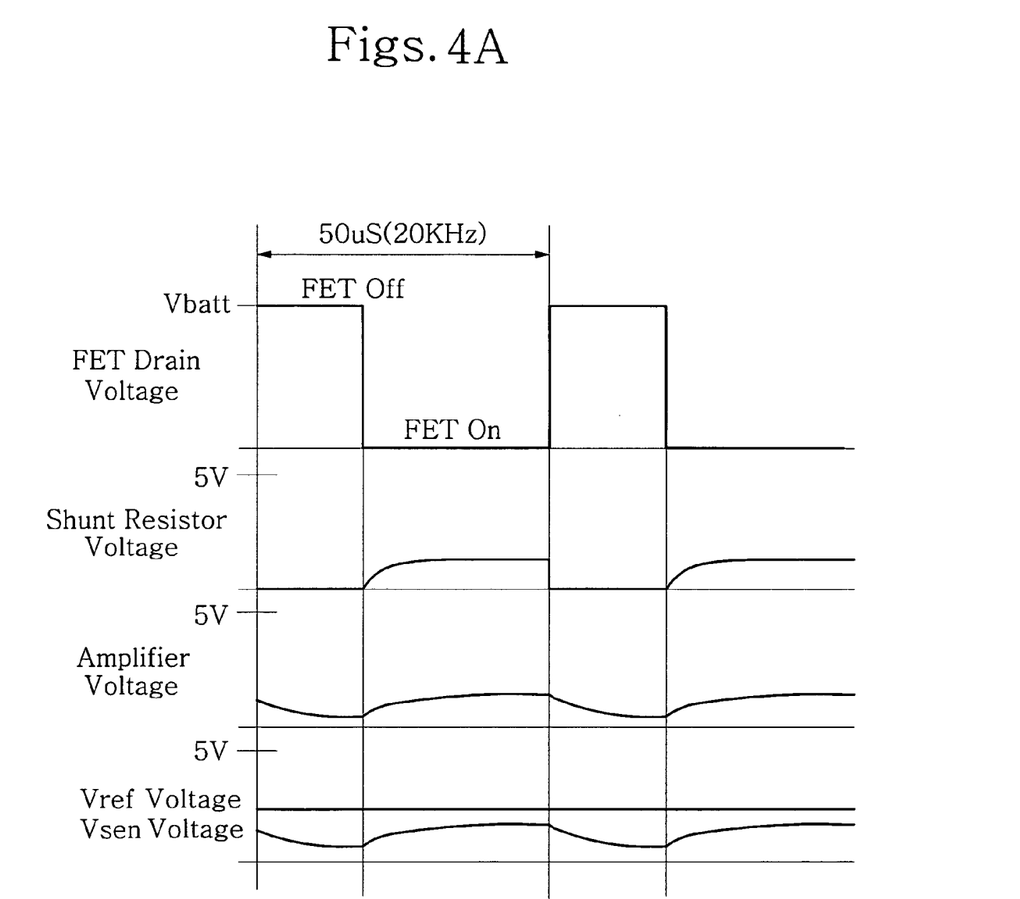
FIGS. 4A and 4B are output waveforms occuring when the motor is in a normal state and over current state, respectively, in accordance with the over current detection apparatus of the present invention.
Figure 4B:
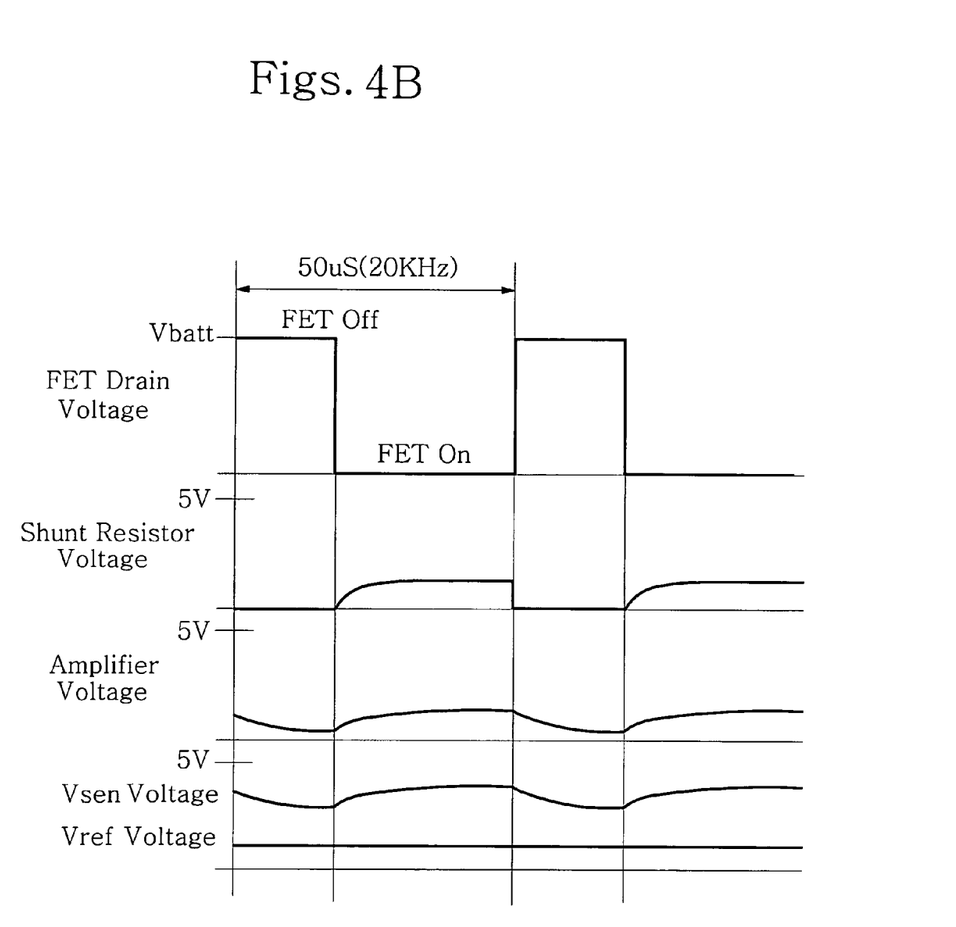

FIGS. 4A and 4B are output waveforms resulting when the motor is in the normal state and over current state, respectively, in accordance with the over current detection apparatus of the invention. Referring to these drawings, details of the invention will be given below.

First of all, the input unit 11 inputs and converts an external square wave signal SIGNAL containing motor drive information duty cycle into an electronic potential of 5 V recognizable by the microprocessor 12.

Then, the microprocessor 12 computes the motor drive information by measuring a length of high or low level of the external square wave signal from the input unit 11.

Next, the microprocessor 12 provides the FET driver 13 with an FET drive control signal so as to drive the motor 16 at a frequency of 20 KHz in accordance with the motor drive information as computed above.

According to this, the FET driver 13 amplifies an FET drive signal based on the FET drive control signal and outputs it to the FET 14 for its driving.

When the FET 14 is ON, the motor 16 is driven by a power (or supply voltage); and when it is OFF, the motor 16 is driven continuously by passing a recovery current produced by the motor through the freewheeling diode 15.

At this time, if the FET 14 providing a power necessary to drive the motor 16 is ON, the current flowing in the motor 16 is passed through the shunt resistor 17 connected to the lower end of the FET 14.

Accordingly, the amplifier 18 detects and amplifies a voltage produced by the current flowing through the shunt resistor 17, while eliminating ground electronic potential effects that vary depending upon the current through the differential amplifier 18', and outputs it the smoothing unit 19.

Thereafter, the smoothing unit 19 smoothes the voltage amplified by the amplifier 18 and delivers it to the microprocessor 12.

After that, the microprocessor 12 inputs the analog voltage from the smoothing unit 19 and converts it into digital data corresponding to the voltage as the motor detection current. Then, the converted digital data, i.e., the detection current of the motor 16 detected at the shunt resistor 17 and the amplifier 18 is compared with a predefined over current detection reference current. As illustrated in FIGS. 4A and 4B, if the detection current, VSen voltage, is less than the reference current, Vref voltage, then it is determined that the motor 16 is in the normal state and continues to operate the motor 16 normally, and, otherwise, if the detection current, VSen voltage, is greater than the reference current, Vref, it is determined that the motor 16 is in the over current state and the operation of the motor 16 is stopped to thereby prevent it from burning out due to the over current.

On the other hand, processes of computing the normal current and constraint current of the motor by drive input conditions of the motor in the overall drive area of the motor, setting an over current detection reference current from the computed normal current and constraint current, and detecting the state of the motor by the microprocessor 12 will be explained in detail with reference to FIGS. 5 and 6 below.

Figure 5:
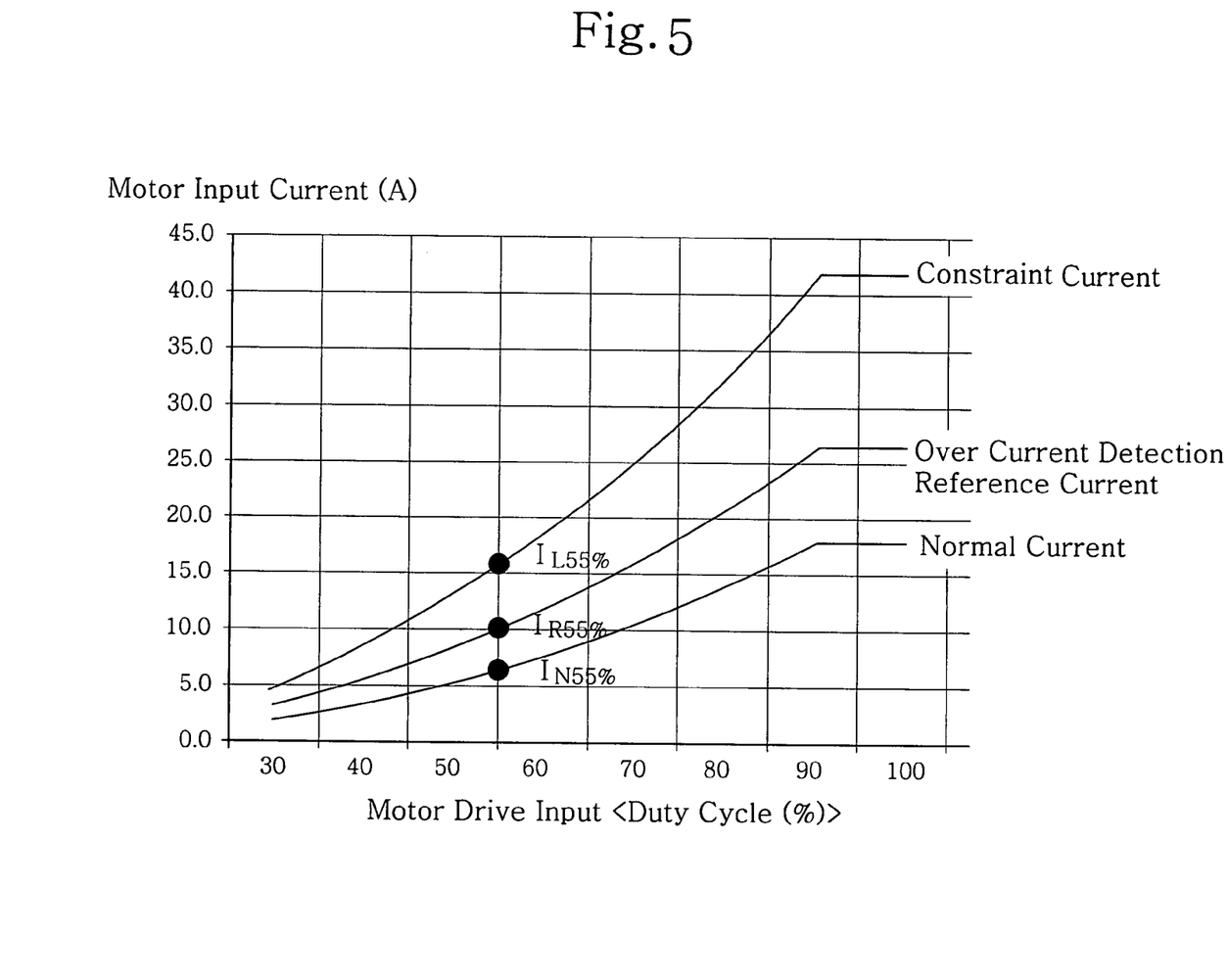
FIG. 5 shows a waveform of each of a normal current, a constraint current, and a first over current detection reference current of the motor so at to set an over current detection reference current by a microprocessor in the over current detection apparatus in accordance with the present invention.
Figure 6:
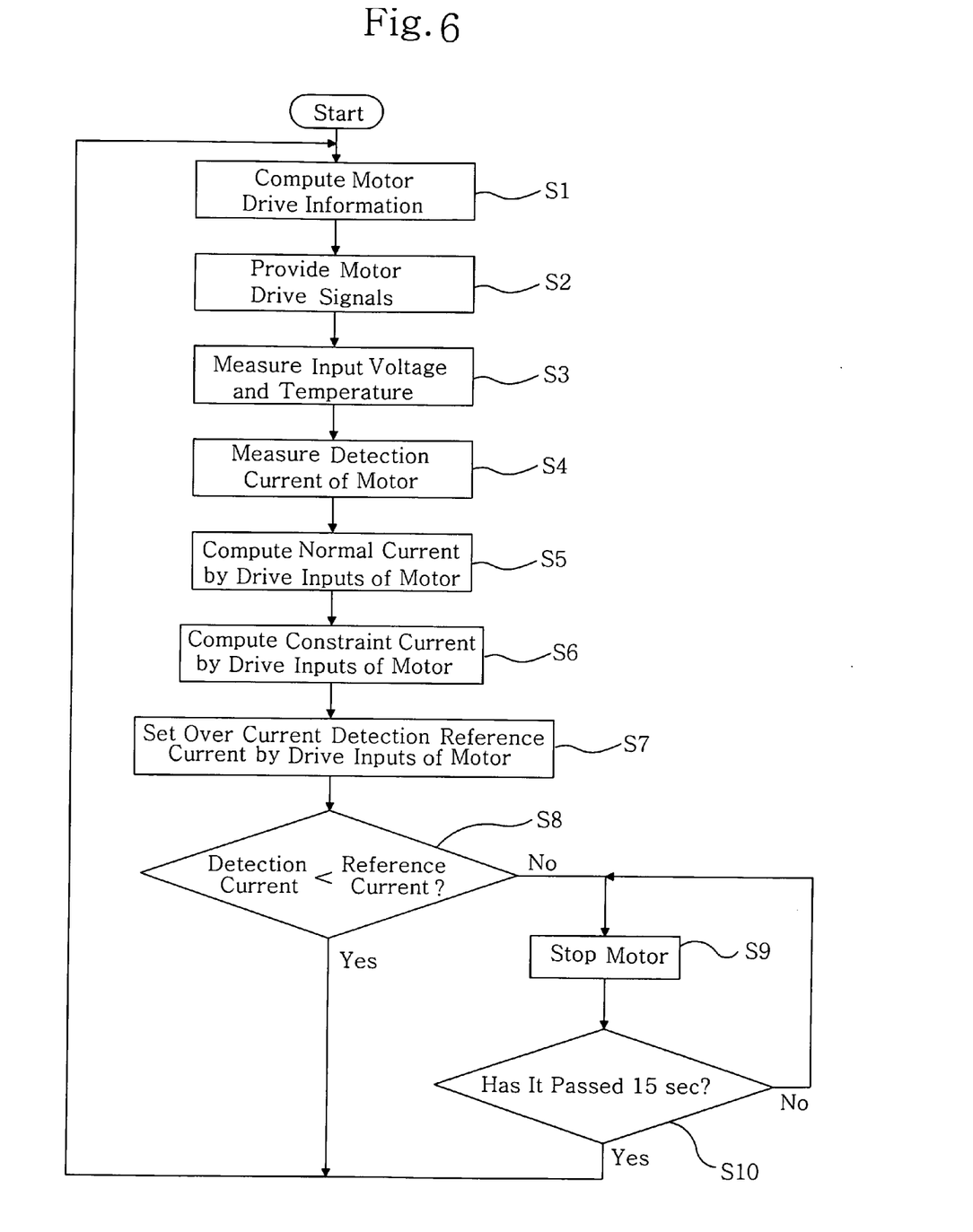
FIG. 6 illustrates a flow chart showing the setting operation of the over current detection reference current, and the over current detection operation of the motor being conducted by the microprocessor in the over current detection apparatus in accordance with the present invention.

FIG. 5 shows a waveform diagram of each of the normal current, the constraint current, and the over current detection reference current of the motor when a duty cycle of the motor drive input is 55%, in order to set the over current detection reference current via the microprocessor 12, and FIG. 6 illustrates a flow chart showing the setting operation of the over current detection reference current, and the over current detection operation of the motor as performed by the microprocessor 12.

Specifically, first of all, the microprocessor 12 inputs the external square wave signal containing motor drive information from the input unit 11 and computes the motor drive information from the signal (S1). Next, it provides motor drive signals, the FET drive control signal, and the FET drive signal, to operate the motor 16 by driving the FET driver 13 and the FET 14 based on the computed motor drive information (S2).

Subsequently, the microprocessor 12 measures voltage supplied to the motor 16 and the temperature of the motor (S3). That is, since the motor current is varied depending upon the voltage and temperature, the present invention precisely measures the current flowing in the motor, by computing the normal current and the constraint current flowing in the motor according to its drive input conditions by properly adding and modifying variations by the input voltage to the motor and its temperature when computing the normal current and constraint current of the motor. This accurate current detection enables the accurate detection of the over current state, upon the next comparison and decision of the detected current and the over current detection reference current.

Next, the microprocessor 12 inputs the voltages produced at the shunt resistor 17 by the current flowing in the motor 16 and the FET 14 through the amplifier 18 and the smoothing unit 19, and converts it into digital data, thereby detecting the current of the motor 16 (S4).

Thereafter, the microprocessor 12 computes the normal current of the motor 16, which corresponds to the drive input conditions of the motor, by properly adding and modifying variations by the input voltage and temperature of the motor measured at said step S3 (S5).

Further, the microprocessor 12 computes the constraint current of the motor 16, which corresponds to the drive input conditions of the motor, by properly adding and modifying variations in the input voltage and temperature of the motor measured at said step S3 (S6).

Next, the microprocessor 12 sets the predefined range between the normal current of the motor 16 computed at said step S5 and the constraint current of the motor 16 computed at said step S6 as shown in FIG. 5, as the over current detection reference current of the motor to decide the over current state (S7).

That is, by computing the normal current and constraint current of the motor by the drive input conditions of the motor within the overall drive area of the motor, and setting the predefined range between the normal current and the constraint current as computed, for example, the average of the two as the over current detection reference current, the change of the over current detection reference current is available for all the drive input conditions of the motor. As a result, this allows more precise detection of the over current state of the motor.

And then, the microprocessor 12 compares the detection current of the motor 16 measured at said step S4 with the over current detection reference current set at said step S7

(S8). In comparison, if the detected current of the motor 16 is less than the reference current, it is determined that the motor 16 is in the normal state and the motor 16 continues to be driven normally. However, if the detected current is larger than the reference current, then it is determined that the motor 16 is in the over current state and then operation of the motor 16 is interrupted for a preset time, e.g., 15 sec (S9 and S10).

As described above, the present invention enables the microprocessor to detect the over current that occurs upon the operation of the motor, by using the normal current and constraint current, which exist for all the drive input conditions of the motor. By doing so, the present invention can prevent the motor from burning out, which allows the motor to be driven stably.

As a result, the present invention can prevent the motor from burning out by more precisely detecting the over current of the motor within the overall drive area thereof. This can be accomplished by setting, as an over current detection reference current, a predefined range between the normal current and the constraint current of the motor by the drive input conditions of the motor, detecting the current of the motor flowing in the FET via the shunt resistor and the differential amplifier, and comparing the detected current with the over current detection reference current.

In other words, by computing the normal current and the constraint current of the motor by the drive input conditions of the motor within the overall drive area of the motor, and setting the predefined range between the normal current and the constraint current as computed, for example, the average of the two as the over current detection reference current, the change of the over current detection reference currents is available for all the drive input conditions of the motor. As a result, when the motor is under the over current condition upon the operation thereof, the more precise detection of such over current state is possible. This can prevent the motor from burning out due to over current, thus enabling the motor to be driven more stably.

While the present invention has been described with respect to the particular embodiments, it will be apparent to those skilled in the art that various changes and modifications may be made without departing from the spirit and scope of the invention as defined in the following claims.

What is claimed is:

1. An apparatus for detecting an over current of a motor in a vehicle, comprising:

an input unit for inputting an external square wave signal including motor drive information with duty cycle, wherein the signal is converted into an electric potential recognizable by a microprocessor;

the microprocessor, which provides a drive control signal to drive a field effect transistor (FET) based on the motor drive information in the external square wave signal from the input unit, sets, as an over current detection reference current to detect an over current state, a predefined range between a normal current and a constraint current by driving input conditions of the motor within an overall drive area of the motor, and compares a motor detection current that corresponds to an output voltage from a smoothing unit with the reference current, wherein it is determined that the motor is in a normal state if the detection current is less than the reference current and in an over current state if the detection current is greater than the reference current, and halts the operation of the motor when the motor is in the over current state;

an FET driver for amplifying and outputting an FET drive signal to drive the motor in response to the FET drive control signal provided by the microprocessor;

an FET turned ON/OFF in accordance with the FET drive signal from the FET driver;

a freewheeling diode for passing a recovery current for continuous operation of the motor when the FET is OFF;

the motor, which is driven in response to the operations of the FET and the freewheeling diode, for providing a driving force necessary for the vehicle's operation;

a shunt resistor connected to one end of the FET for detecting a current of the motor flowing in the FET;

an amplifier for detecting and amplifying a voltage produced by the current flowing via the shunt resistor, while eliminating ground electronic potential effects that vary depending upon the current, using a differential amplifier; and the smoothing unit for smoothing the voltage amplified by the amplifier and providing the smoothed voltage to the microprocessor.

2. The apparatus as recited in claim 1, wherein the microprocessor measures voltage applied to the motor and motor temperature, and adds and modifies variations by the measured voltage and temperature, to thereby compute the normal current and the constraint current of the motor.

3. The apparatus as recited in claim 1, wherein the microprocessor sets an average of the normal current and the constraint current of the motor as the over current detection reference current.

\* \* \* \* \*